United States Patent Office 2,792,401
Patented May 14, 1957

2,792,401

ISONICOTINYLHYDRAZIDE DERIVATIVE

Robert Michel Jacob, Ablon-sur-Seine, and Leonide Liakhoff, Vitry-sur-Seine, France, assignors to Societe des Usines Chimiques Rhone-Poulenc, Paris, France, a corporation of France No Drawing. Application November 25, 1955,
Serial No. 549,168

Claims priority, application France December 1, 1954

2 Claims. (Cl. 260—295)

This invention relates to a new derivative of isonicotinylhydrazide and to processes for its preparation.

It is known that isonicotinylhydrazide possesses antibacterial properties and is particularly useful in the treatment of tuberculosis.

As the result of research and experimentation, it has now been found that the hitherto unknown isonicotinylhydrazide derivative of the formula:

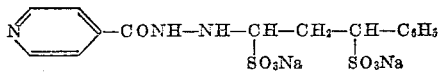

viz. the disodium salt of 1-isonicotinylhydrazo-3-phenyl-n-propane-1:3-disulphonic acid, possesses the antibacterial properties of isonicotinylhydrazide but is substantially less toxic.

According to a feature of the present invention the new derivative may be prepared by reacting isonicotinylhydrazide with cinnamaldehyde bisulphite of the formula:

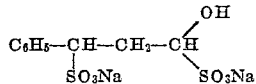

Preferably the reaction is carried out at a temperature between 40° and 100° C. with the reactants in substantially equimolecular proportions and the cinnamaldehyde bisulphite in aqueous solution.

According to a further feature of the invention, the new derivative may be prepared by reacting 1-isonicotinyl-2-cinnamylidene hydrazine with sodium bisulphite, for example by heating the former with an aqueous solution of the latter, preferably with agitation on a water bath.

When prepared by either of the aforesaid processes, the product of the invention is normally isolated as a crystalline solid containing a variable amount of water of crystallisation.

The following examples illustrate the invention.

Example I

Cinnamaldehyde (26.4 g.) is added gradually with agitation under an inert atmosphere to an aqueous solution (95 cc.; 440 g./litre) of sodium bisulphite heated on a boiling water-bath. A bulky precipitate forms which dissolves after 15 minutes heating giving a clear colourless solution. Isonicotinylhydrazide (27.4 g.) is then added giving a pale yellow solution which soon crystallises and which is kept on a water-bath for about 1½ hours. It is then cooled and the product which has crystallised is filtered off, washed with aqueous ethanol followed by absolute ethanol and dried in vacuo over sulphuric acid. There is thus obtained the hydrated disodium salt of 1-isonicotinylhydrazo-3-phenyl-n-propane - 1:3 - disulphonic acid (65 g.). This product may be recrystallised by dissolving it in water at room temperature and adding acetone. There is thus obtained a white, well crystalline solid which, after drying to constant weight in vacuo over sulphuric acid, gives the following analysis: percent N=8.35; percent S=12.45; percent Na=8.85; percent H₂O=9.6. The theoretical values for a product containing 3 molecules of water of crystallisation are: percent N=8.18; percent S=12.45; percent Na=8.97; percent H₂O=10.5.

Example II 1-isonicotinyl-2-cinnamylidene hydrazine (12.5 g.) is added to an aqueous solution (22.6 cc.; 460 g./litre) of sodium bisulphite. The mixture is agitated for 1½ hours on a boiling water-bath, is left to cool and the solid obtained is filtered off. The solid product is treated with water (70 cc.) at room temperature, the insoluble matter which is the initial hydrazone is filtered off and acetone (375 cc.) is added to the filtrate. The product which crystallises is filtered off, washed and dried and is identical with the product obtained in Example I.

We claim:
1. The disodium salt of 1-isonicotinylhydrazo-3-phenyl-n-propane-1:3-disulphonic acid, of the formula:

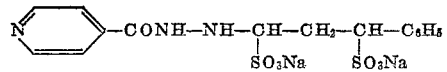

2. The hydrated product of the compound recited in claim 1.

References Cited in the file of this patent

UNITED STATES PATENTS 2,628,237    Fox _____ Feb. 10, 1953

OTHER REFERENCES

Behnisch: Chem. Abstracts, vol. 47, 3343–4 (1953).
Sah et al.: J. Am. Pharm. Assoc., vol. 43, pp. 513–24 (1954).